(12) United States Patent
Bisson et al.

(10) Patent No.: US 10,246,365 B2
(45) Date of Patent: Apr. 2, 2019

(54) APPARATUS AND METHOD FOR FORMING THIN GLASS ARTICLES

(71) Applicant: CORNING INCORPORATED, Corning, NY (US)

(72) Inventors: Antoine Gaston Denis Bisson, Corning, NY (US); Allan Mark Fredholm, Vulaines sur Seine (FR); Vincent Guillard, Fountainebleau (FR)

(73) Assignee: CORNING INCORPORATED, Corning, NY (US)

( * ) Notice: Subject to any disclaimer, the term of this patent is extended or adjusted under 35 U.S.C. 154(b) by 4 days.

(21) Appl. No.: 14/505,786

(22) Filed: Oct. 3, 2014

(65) Prior Publication Data

US 2015/0099618 A1 Apr. 9, 2015

Related U.S. Application Data

(60) Provisional application No. 61/888,623, filed on Oct. 9, 2013.

(51) Int. Cl.
*C03B 13/00* (2006.01)
*C03B 17/06* (2006.01)
(Continued)

(52) U.S. Cl.
CPC .......... *C03B 35/246* (2013.01); *C03B 13/00* (2013.01); *C03B 17/061* (2013.01);
(Continued)

(58) Field of Classification Search
CPC .................................................. C03B 40/04
See application file for complete search history.

(56) References Cited

U.S. PATENT DOCUMENTS

| 4,203,750 A | | 5/1980 | Shay ................................ 65/99 |
| 5,423,468 A | * | 6/1995 | Liedtke .................. B65H 23/24 |
| | | | 242/615.12 |

(Continued)

FOREIGN PATENT DOCUMENTS

| EP | 2022764 A1 | 2/2009 | |
| EP | 2258664 | 8/2010 | ............. C03B 13/08 |

(Continued)

OTHER PUBLICATIONS

Patent Cooperation Treaty International Notifcation of Transmittal of the International Search Report and the Written Opinion of the International Searching Authority, international application No. PCT/US2014/059587: dated Dec. 16, 2014, 11 pages.

(Continued)

*Primary Examiner* — Lisa L Herring
(74) *Attorney, Agent, or Firm* — Kevin M. Johnson

(57) ABSTRACT

Embodiments of a method of forming a glass article are disclosed. The methods include supplying a glass ribbon in a first direction and redirecting the glass ribbon to a second direction different from the first direction without contacting the glass ribbon with a solid material. The glass ribbon may exhibit a viscosity of less than about $10^8$ Poise and a thickness of about 1 mm or less. Embodiments of a glass or glass-ceramic forming apparatus are also disclosed. The apparatus may include a glass feed device for supplying a glass ribbon in a first direction and a redirection system disposed underneath the glass feed device for redirecting the glass ribbon to a second direction. In one or more embodiments, the redirection system comprising at least one gas bearing system for supplying a gas film to support the glass ribbon.

20 Claims, 12 Drawing Sheets

(51) Int. Cl.
  *C03B 35/18* (2006.01)
  *C03B 35/24* (2006.01)
  *C03C 10/00* (2006.01)

(52) U.S. Cl.
  CPC .......... *C03B 17/067* (2013.01); *C03B 35/188* (2013.01); *C03C 10/00* (2013.01); *C03C 2204/00* (2013.01)

(56) References Cited

U.S. PATENT DOCUMENTS

| | | | |
|---|---|---|---|
| 5,885,315 A | 3/1999 | Fredholm et al. | ............... 65/102 |
| 5,970,747 A | 10/1999 | Fredholm et al. | ............... 65/253 |
| 6,101,845 A * | 8/2000 | Kojima | .................. C03B 13/04 |
| | | | 198/626.1 |
| 8,211,505 B2 | 7/2012 | Bocko et al. | ................. 427/420 |
| 8,713,972 B2 | 5/2014 | Lakota et al. | |
| 9,003,835 B2 | 4/2015 | Lock | |
| 2005/0178159 A1 | 8/2005 | Shiraishi et al. | ............ 65/182.2 |
| 2006/0010915 A1 * | 1/2006 | Greulich-Hickmann | .................... |
| | | | C03B 13/04 |
| | | | 65/25.3 |
| 2008/0115536 A1 | 5/2008 | Shiraishi et al. | |
| 2009/0100873 A1 * | 4/2009 | Allan | .................... C03B 17/064 |
| | | | 65/85 |
| 2009/0205373 A1 * | 8/2009 | Kojima | .................. C03B 13/04 |
| | | | 65/90 |
| 2010/0281921 A1 * | 11/2010 | Bisson | .................... C03B 17/06 |
| | | | 65/101 |
| 2011/0019123 A1 * | 1/2011 | Prest | ....................... C03C 19/00 |
| | | | 349/58 |
| 2011/0236633 A1 * | 9/2011 | Takaya | .................. C03B 17/064 |
| | | | 428/141 |
| 2012/0135848 A1 * | 5/2012 | Beall | .................... C03C 10/0027 |
| | | | 501/32 |
| 2012/0159989 A1 | 6/2012 | Shiraishi et al. | ............... 65/25.3 |
| 2012/0304695 A1 | 12/2012 | Lakota et al. | ............... 65/29.12 |
| 2013/0047671 A1 | 2/2013 | Kohli | |
| 2014/0144181 A1 | 5/2014 | Poissy | |
| 2014/0318184 A1 | 10/2014 | Likitvanichkul et al. | |
| 2015/0027169 A1 | 1/2015 | Fredholm | |

FOREIGN PATENT DOCUMENTS

| | | | |
|---|---|---|---|
| EP | 2258664 A1 | 12/2010 | |
| FR | 2741335 | 5/1997 | ............. C03B 13/08 |
| JP | 58145627 A | 8/1983 | ............. C03B 15/12 |
| JP | 63315529 A | 12/1988 | |
| JP | 10167740 A | 6/1998 | |
| JP | 2001031435 A | 2/2001 | |
| JP | 2011042508 A | 3/2011 | |
| JP | 2011126724 A | 6/2011 | |
| WO | WO-2007132797 A1 * | 11/2007 | ............. C03B 13/04 |
| WO | 2012166761 | 12/2012 | ............. C03B 13/04 |
| WO | 2013033063 A1 | 3/2013 | ............. C03B 17/06 |
| WO | WO 2013082212 A1 * | 6/2013 | ............. C03B 13/08 |

OTHER PUBLICATIONS

English Translation of JP2016521744 Office Action dated August 28, 2018; 9 Pages; Japanese Patent Office.

* cited by examiner

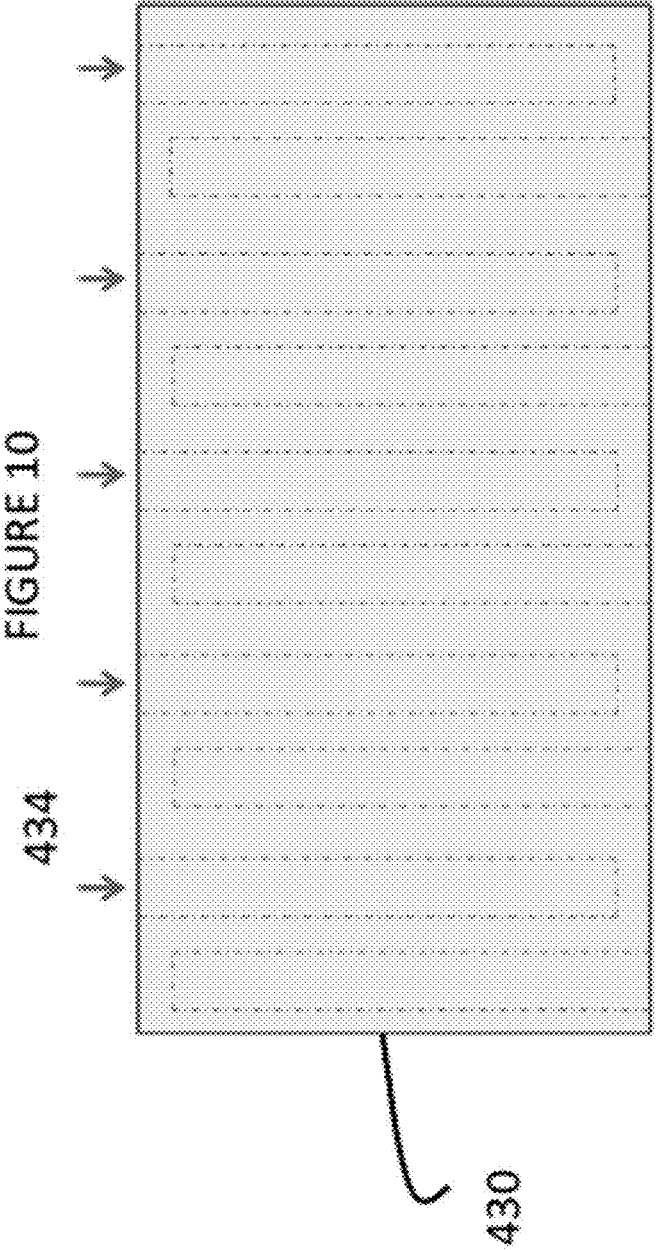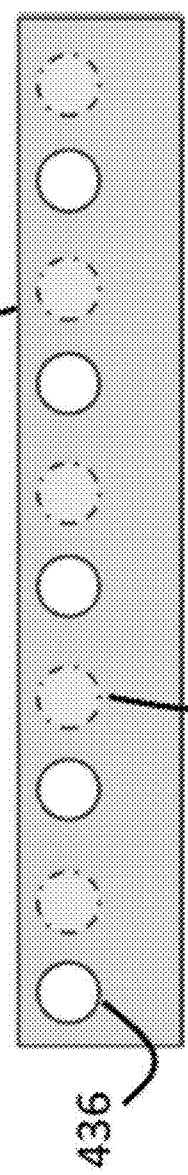

APPARATUS AND METHOD FOR FORMING THIN GLASS ARTICLES

CROSS-REFERENCE TO RELATED APPLICATIONS

This application claims the benefit of priority under 35 U.S.C. § 119 of U.S. Provisional Application Ser. No. 61/888,623, filed on Oct. 9, 2013, the content of which is relied upon and incorporated herein by reference in its entirety.

BACKGROUND

The disclosure relates to apparatuses and methods for forming thin glass article, and more particularly to apparatus and methods for forming thin glass articles in an at least partially horizontal direction.

Articles such as electronic devices (e.g., mobile phones, smart phones, tablets, video players, information terminal devices, laptop computer, etc.), architectural structures (e.g., countertops or walls), appliances (e.g., cooktops, refrigerator and dishwasher doors, etc.), information displays (e.g., whiteboards), and automotive components (e.g., dashboard panels, windshields, window components, etc.) incorporate various substrates as internal components or external components. When used in such articles, the substrate can be part of a housing or a display. When used in a display, the substrate may be referred to as a cover substrate and, in some instances, may form part of a touch module. Cover substrates are often transparent and scratch-resistant. Substrates used as housing can form the sides, back and front portions of housing and may exhibit scratch-resistance and opacity, instead of exhibiting transparency.

With continuing efforts to make some articles or components of articles lighter and thinner and to include even greater functionality, substrates, whether used as cover substrates or housing substrates, are becoming thinner (e.g., about 1 mm or less). As substrates become thinner, they are also more susceptible the surface damage that may be imparted on the substrate during processing (e.g., the process steps to provide a thinner substrate). Examples of such surface damage can include thermally or mechanically imprinted scars or marks to the glass substrate when in a molten or viscous form. It has become more important to develop apparatuses and/or methods for providing thin substrates having improved surface quality.

In some applications, the substrate may include glass articles (which may optionally be used as a precursor to glass-ceramics) with specific properties of interest such as low thermal expansion and mechanical strength. In some instances, glass forming methods may be unsuitable as they are not compatible with glasses with the tendency for devitrification (e.g., when the liquidus viscosity is below 50,000 poises). In these instances, the molten glass flow at sufficiently high temperatures and/or low viscosity may be required to avoid devitrification. Alternative glass processes such as rolling may be used; however, known rolling processes are unable to provide a glass article thickness of less than about 2 mm. Moreover, known rolling processes utilize equipment that is vertically oriented, which can require tall processes with costly plant elevation, complex glass article position and speed control along the vertical length and complex separation methods. Accordingly, there is a need for an apparatus and/or process that provides thin glass articles having a thickness of about 1 mm or less, with improved surface quality, made by processes and apparatus having a compact layout.

SUMMARY

A first aspect of the present disclosure pertains to a method of forming a glass article. In one or more embodiments, the method includes supplying a glass ribbon in a first direction and redirecting the glass ribbon to a second direction different from the first direction without contacting the glass ribbon with a solid material. In one variant, supplying the glass ribbon may include flowing molten glass between at least one pair of forming rolls and optionally reducing the thickness of the glass ribbon. The molten glass is flowed vertically. In another variant, supplying the glass ribbon comprises flowing molten glass into a forming body comprising a plurality of walls defining an open channel and overflowing the flowing molten glass over the walls of the forming body into two individual flows of molten glass, which may be flowed vertically, that combine to form the glass ribbon. In yet another variant, supplying the glass ribbon includes flowing molten glass through a forming body comprising an open slot.

In one or more embodiments, at least a portion of the glass ribbon exhibits a viscosity of less than about $10^8$ poise or about $10^{7.6}$ poise or less. In one or more specific embodiments, the glass ribbon exhibits a thickness of about 1 mm or less when redirected in the second direction. At least a portion of the glass ribbon may have a temperature in the range from about 200° C. to about 400° C. In some embodiments, redirecting the glass ribbon in the second direction may also include maintaining the glass ribbon temperature in the range from about 200° C. to about 400° C. In a specific embodiment, the method may include creating a tension in the glass ribbon.

In one option, redirecting the glass ribbon may include supporting the glass ribbon on a gas film supplied by directing gas to the glass ribbon having a pressure in the range from about $1 \times 10^5$ Pa to about $3 \times 10^5$ Pa. In another option, the method may include directing gas to the glass ribbon having a temperature in the range from about 200° C. to about 400° C. In one variant, directing gas to the glass ribbon may include guiding the glass ribbon along a first gas bearing including a curved support and may also optionally include guiding the glass ribbon along a second gas bearing including a horizontally disposed, planar support after guiding the glass ribbon along the first gas bearing. In one or more embodiments, directing gas to the glass ribbon comprises guiding the glass ribbon onto a gas bearing comprising a horizontally disposed, planar support, without guiding the glass ribbon along a gas bearing including a curved support.

In one or more embodiments, the method may include sensing the shape of the glass ribbon as it is redirected and controlling at the speed of at least one of the glass ribbon supply and the gas directed to the glass ribbon based on the sensed shape. The method may further include cooling the glass ribbon into a glass sheet and may optionally processing the glass sheet by an ion exchange process and/or ceramming process. One aspect of the present disclosure pertains to a glass-ceramic made according to embodiments of the methods described here.

A second aspect of the present disclosure pertains to a glass ribbon forming apparatus: The apparatus of one or more embodiments may include a glass feed device for supplying a glass ribbon in a first direction and a redirection system disposed underneath the glass feed device for redirecting the glass ribbon to a second direction. At least a portion of the glass ribbon may exhibit a viscosity of less than about $10^8$ Poise. In one or more embodiments, the redirection system may include at least one gas bearing system for supplying a gas film for supporting the glass ribbon. The gas bearing may include a curved support for providing an arcuate gas film that redirects the glass ribbon to the second direction. The curved support may be rotatable around a first axis in the direction in which the glass ribbon is supplied or may be stationary.

The apparatus may include a second gas bearing used in combination with the first gas bearing. The second gas bearing can include a horizontally disposed, planar support for providing a planar gas film that supports the redirected glass ribbon in the second direction. In some embodiments, a gas bearing including a horizontally disposed, planar support may be used without the gas bearing including a curved support.

In one or more embodiments, the apparatus may include a system including a sensor for detecting a shape of the redirection of the glass ribbon in communication with a speed control. The sensor may signal an increase or decrease to the speed control based on the shape of the redirection of the glass ribbon. In one embodiment, the sensor may include an optical detector. In another embodiment, the speed control may be in communication with either or both of the glass supply feed and/or at least one gas bearing.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 10 illustrates a top view of a horizontal support, according to one or more embodiments.

FIG. 11 shows a side view of the horizontal support shown in FIG. 10.

DETAILED DESCRIPTION

Figure 1:
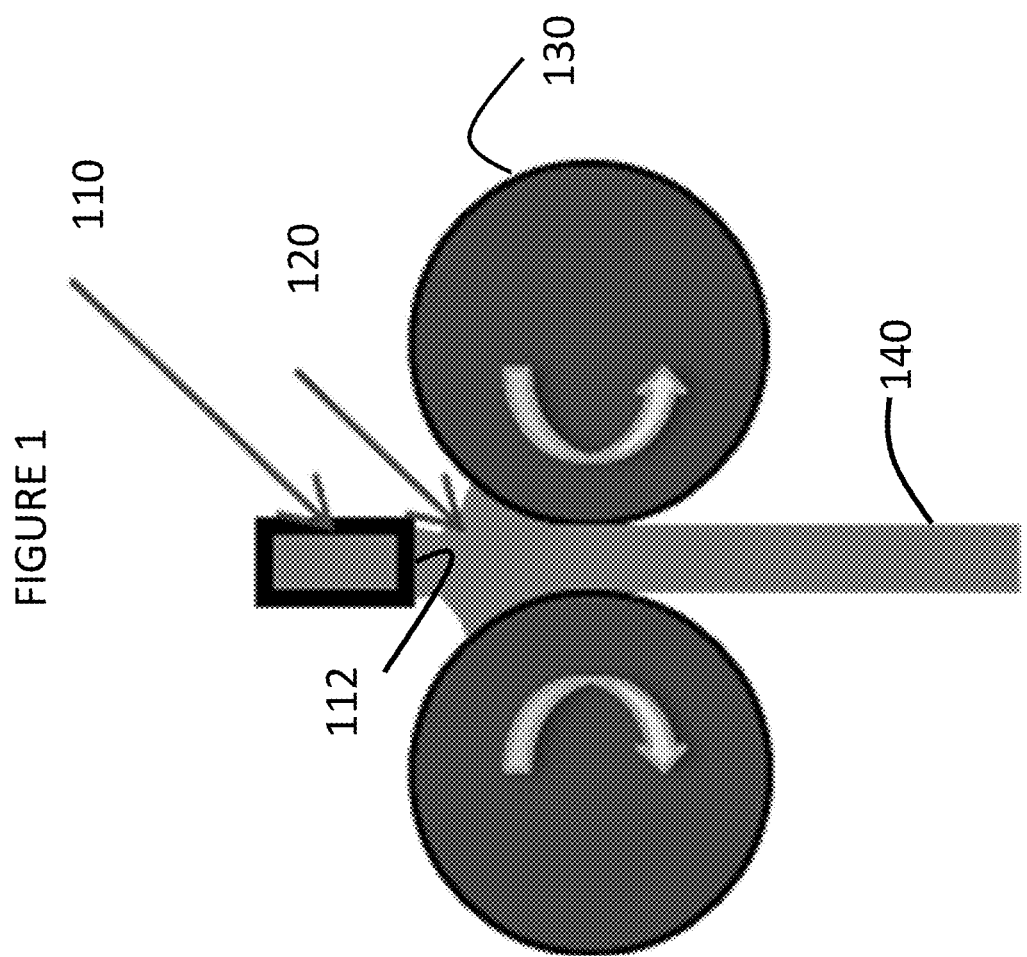
FIG. 1 is a side view of an apparatus for forming a glass ribbon, according to one or more embodiments.

Reference will now be made in detail to the present preferred embodiment(s), examples of which are illustrated in the accompanying drawings. Whenever possible, the same reference numerals will be used throughout the drawings to refer to the same or like parts.

A first aspect of this disclosure pertains to a method for forming a glass sheet in which a glass ribbon is formed in a first direction (e.g., vertical) and redirected to a second direction different from the first direction (e.g., horizontal), while maintaining the surface quality of the glass ribbon. In some embodiments, the method includes redirecting the glass ribbon when the glass ribbon is viscous (e.g., has a viscosity less than about $10^8$ poise) and/or by completing the redirection of the glass ribbon along a turn or curve having a horizontal length of less than about 1.5 m. In one or more embodiments, the method includes redirection of the glass ribbon from a vertical or essentially vertical direction to a horizontal direction along a horizontal length of about 200 mm or less.

Known processes in which a glass ribbon is redirected from a vertical process to a horizontal process typically utilize higher viscosity glasses. For example, known processes and apparatus may use glasses with viscosities of greater than $10^8$ poise and such glasses may develop significant and undesirable elastic stresses during processing. Moreover, the higher viscosity glasses may still require use of an apparatus with a larger layout. For example, the radius of the turn or redirection may need to be great enough (e.g., greater than about 1.5 m) to enable redirection of the glass ribbon formed from higher viscosity glasses using an air bearing. Significant elastic stresses will therefore possibly develop. The embodiments of the methods described herein address these issues.

In one or more embodiments, the method includes supplying a glass ribbon in the first direction, where at least a portion of the glass ribbon exhibits a low viscosity. As used herein, "low viscosity" includes a viscosity of less than about $10^8$ poise, less than about $10^{7.8}$ poise, less than about $10^{7.6}$ poise, less than about $10^{7.4}$ poise, less than about $10^{7.2}$ poise, less than about $10^7$ poise and all ranges and subranges therebetween. In one or more embodiments, the glass ribbon has a low viscosity that is greater than about $10^6$ poise.

Figure 2:
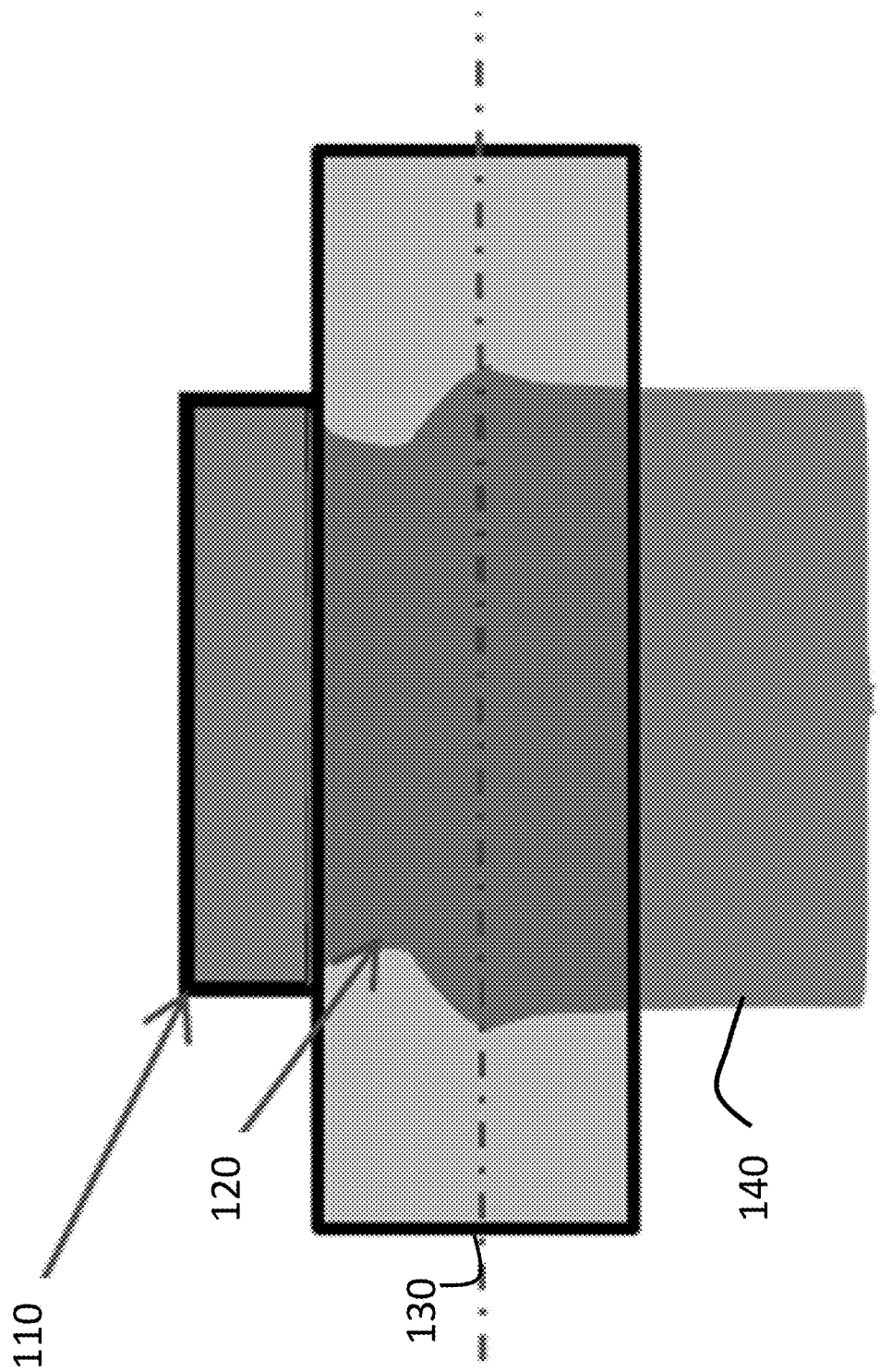
FIG. 2 is a front view of the apparatus shown in FIG. 1.

The method may include supplying a glass ribbon in the first direction by a number of ways. As shown in FIGS. 1 and 2, supplying the glass ribbon may include flowing molten glass 120 through a forming body 110 including an open slot 112. The molten glass 120 may be flowed in a vertical direction or allowed to free flow in a vertical direction to land on a roll pair 130, which rotates to form the glass ribbon 140.

Figure 3:
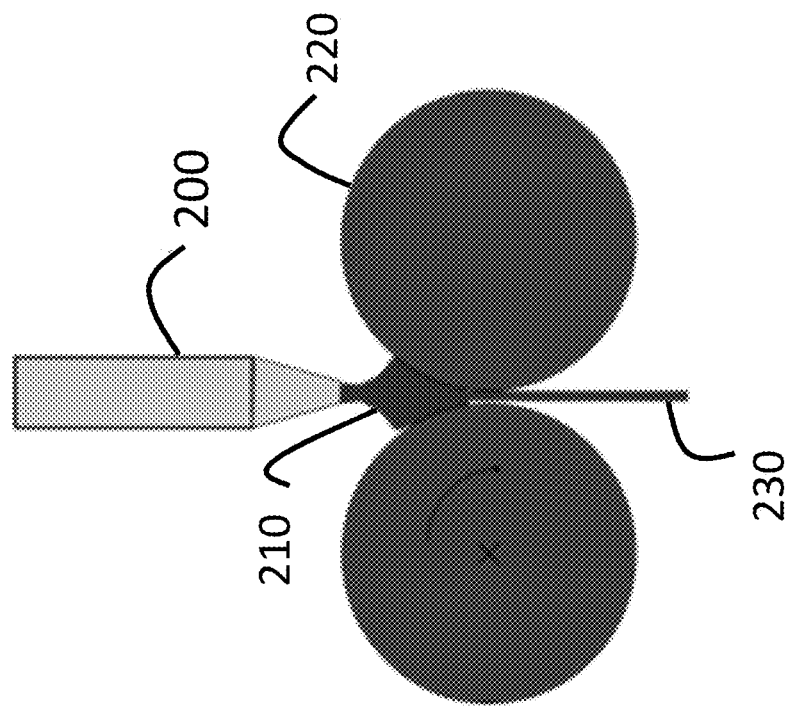
FIG. 3 is a side view of an apparatus including a single pair of forming rolls, according to one or more embodiments.
Figure 4:
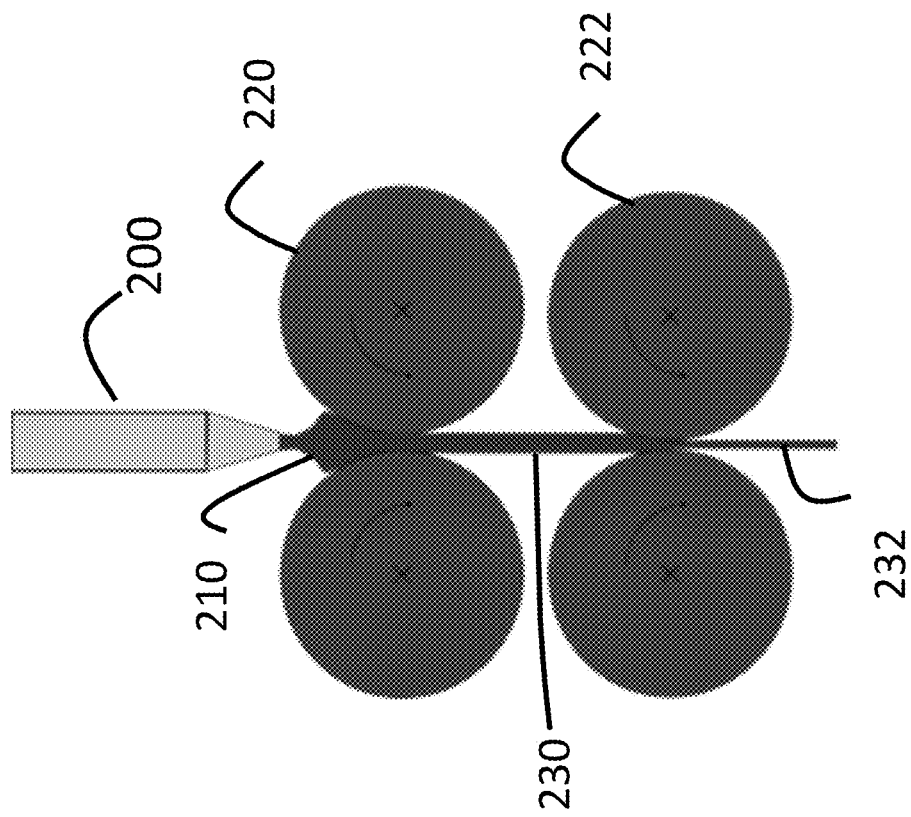
FIG. 4 is a side view of an apparatus including a single pair of forming rolls and a single pair of sizing rolls, according to one or more embodiments.
Figure 5:
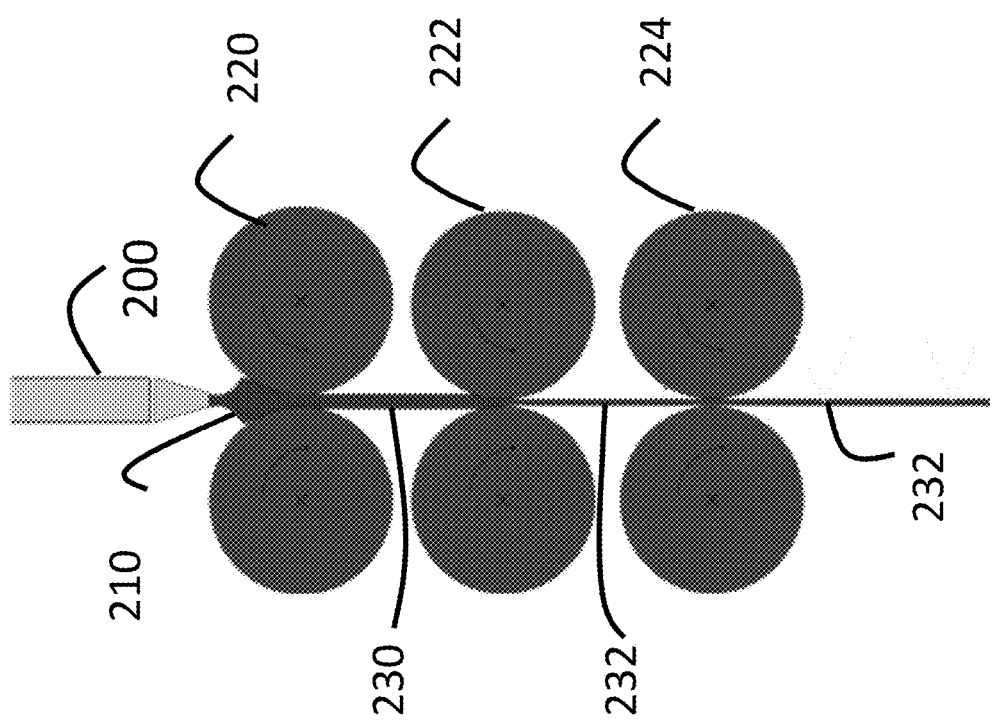
FIG. 5 is a side view of an apparatus including a single pair of forming rolls, a single pair of sizing rolls and a single pair of, according to one or more embodiments.
Figure 6:
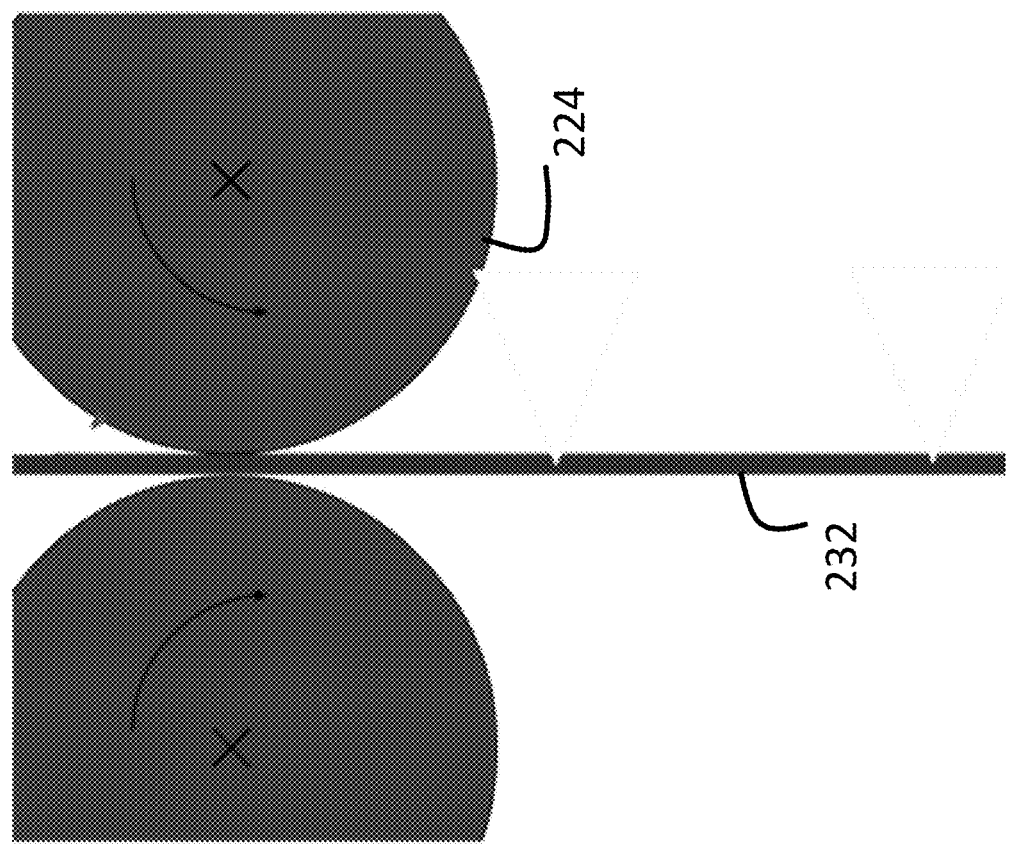
FIG. 6 is an enlarged view of the apparatus shown in FIG. 5.

As shown in FIG. 3, supplying a glass ribbon in the first direction may include flowing molten glass 210 between at least one pair of forming rolls 220. A glass feed unit 200 may supply the molten glass 210 at a temperature of 1000° C. or higher. In one embodiment, the pair forming rolls may be heated and may, for example, be maintained at a surface temperature of about 250° C. or higher, 500° C. or higher, or 600° C. or higher. The pair of forming rolls 220 may be located vertically below the glass feed unit 200 and forms the molten glass into a formed glass ribbon 230 having a thickness near a desired thickness. In some embodiments, more than one pair of forming rolls 220 may be utilized to form the glass ribbon (e.g., two, three, four or more pairs of forming rolls). In a more specific embodiment, the method may include reducing the thickness of the glass ribbon 230 by supplying the formed glass ribbon 230 between at least one pair of sizing rolls 222, as shown in FIG. 4. In one or more embodiments, more than one pair of sizing rolls 222 may be utilized to reduce the thickness of the glass ribbon (e.g., two, three, four or more pairs of sizing rolls). The method may include maintaining the surface temperature of the sizing rolls at about 400° C. or lower, 300° C. or lower, or 200° C. or lower. The sizing rolls 222 may be located vertically below the forming rolls 220 and receives the formed glass ribbon 230 and thins it to produce a sized glass ribbon 232 having a desired thickness and a desired thickness uniformity. The thickness of the sized glass ribbon 232 may vary by no more than +/−0.025 mm. As shown in FIGS. 5 and 6, a pair of pulling rolls 224 may be located vertically below the sizing rolls 222 for receiving the sized glass ribbon 232 and creating a tension on the formed glass ribbon 230 and/or the sized glass ribbon 232. An optional notch may be disposed on one or more of the rolls to create a local imprint on the glass ribbon that facilitates later processing, such as separating or cutting the glass sheet into separate glass articles.

In one or more alternative embodiments, supplying the glass ribbon may include forming the glass ribbon by a fusion forming process (not shown). In one or more specific embodiments, the method includes flowing molten glass from a forming body including an open channel (not shown) defined by a plurality of walls (not shown). The molten glass flows into the open channel and overflows the walls thereof, thereby separating into two individual flows of molten glass that flow over the converging forming surfaces (not shown). When the individual flows of molten glass are flowed vertically and are recombined to form a single ribbon of molten glass that descends from the forming body. In this manner, the method includes drawing the glass ribbon in a first direction, which may be vertical.

Figure 7:
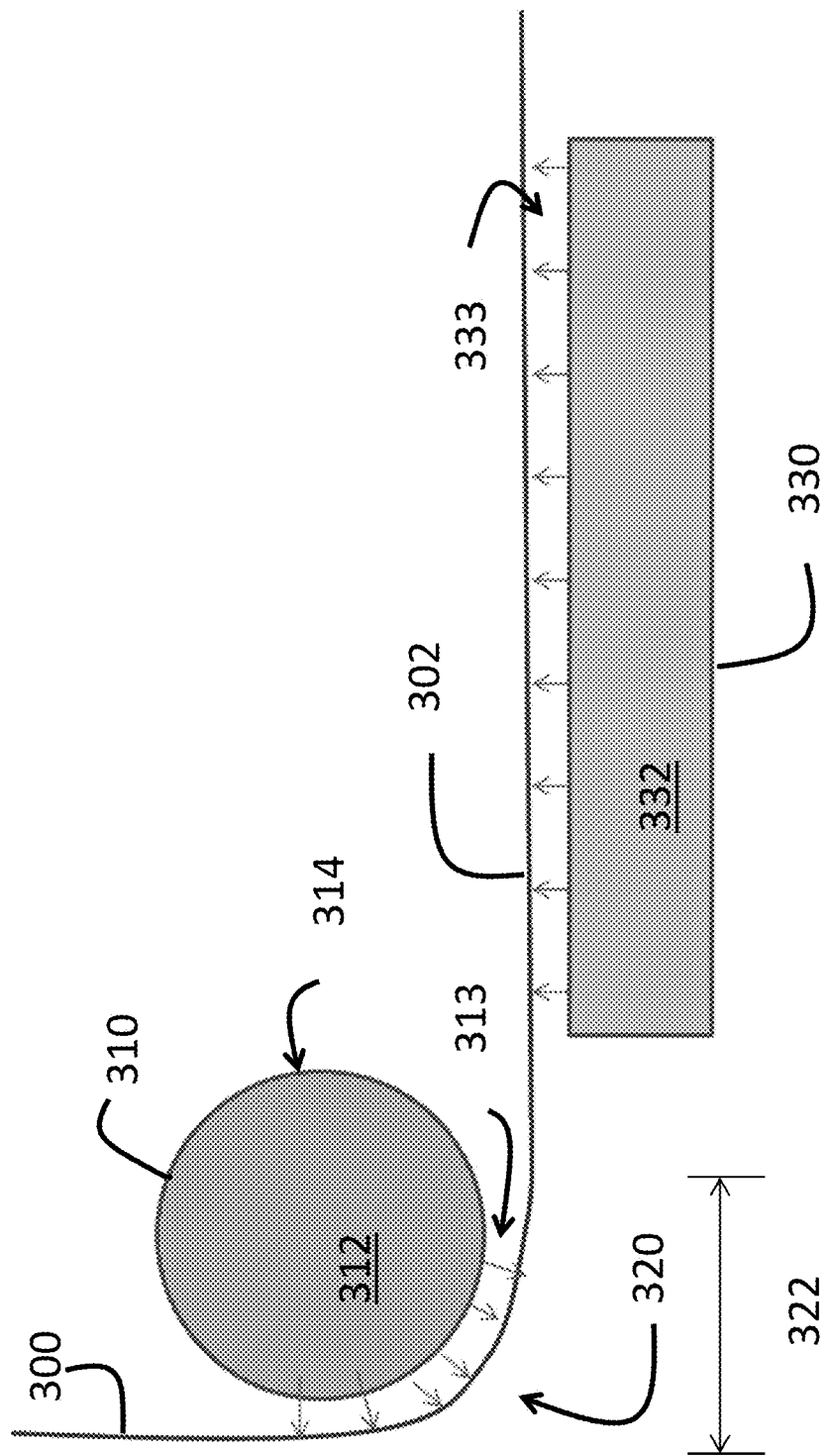
FIG. 7 illustrates an apparatus for redirecting a glass ribbon, according to one or more embodiments.
Figure 8:
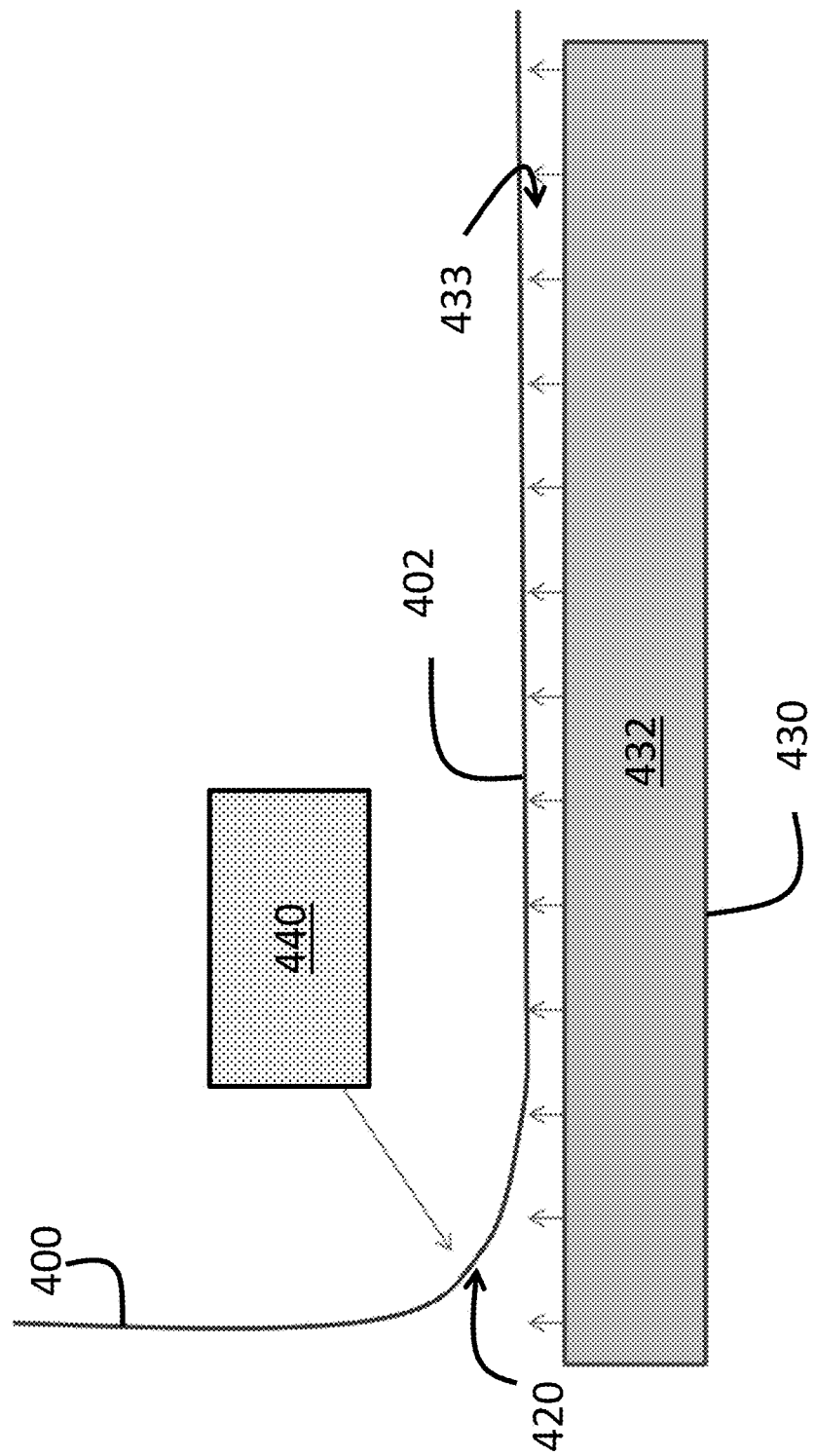
FIG. 8 illustrates an alternative embodiment of an apparatus for redirecting a glass ribbon.
Figure 9:
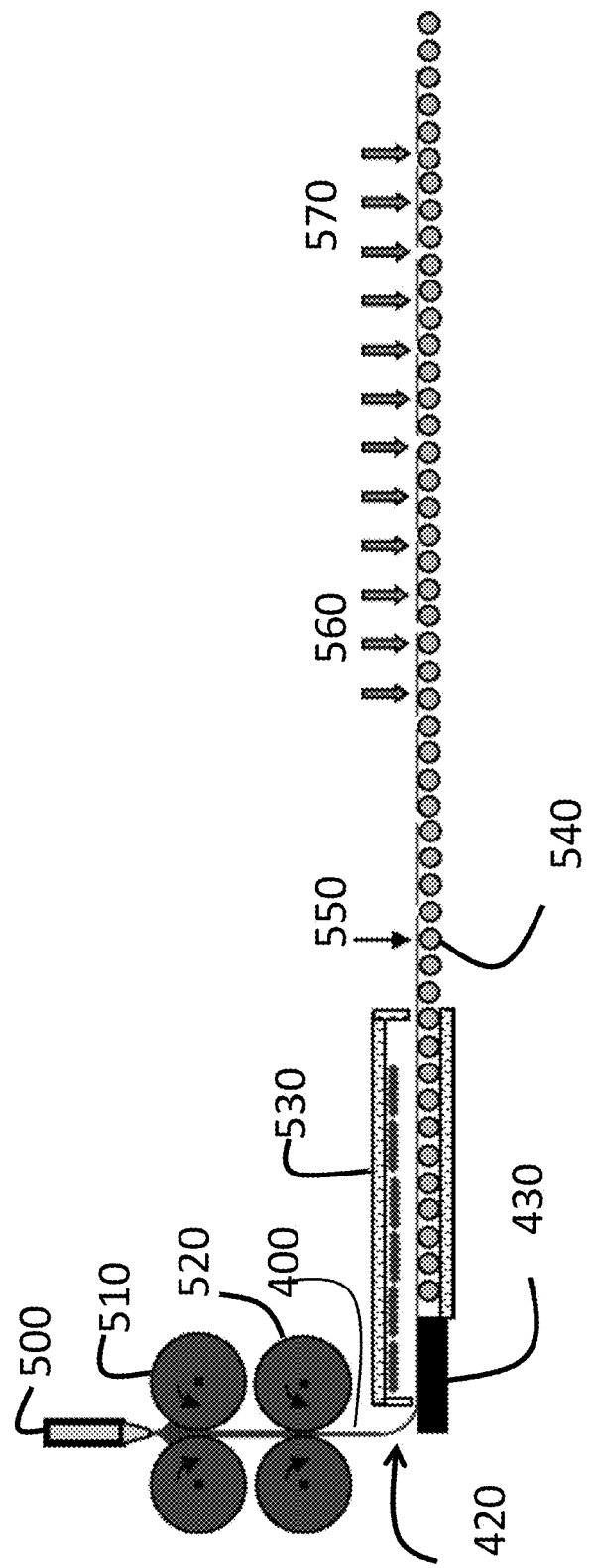
FIG. 9 illustrates the apparatus shown in FIG. 8 and additional downstream apparatuses, according to one or more embodiments.

In one or more embodiments, the method includes redirecting the glass ribbon from a first direction to a second direction different from the first direction, without contacting the glass ribbon with a solid material. As shown in FIGS. 7-9, redirecting the glass ribbon to a second direction different from the first direction without contacting the glass ribbon may include supporting the glass film on a gas film supplied by directing gas at the glass ribbon at a pressure in the range from about $1\times10^5$ Pa to about $3\times10^5$ Pa, from about $1.2\times10^5$ Pa to about $3\times10^5$ Pa, from about $1.4\times10^5$ Pa to about $3\times10^5$ Pa, from about $1.6\times10^5$ Pa to about $3\times10^5$ Pa, from about $1.8\times10^5$ Pa to about $3\times10^5$ Pa, from about $1\times10^5$ Pa to about $2.8\times10^5$ Pa, from about $1\times10^5$ Pa to about $2.6\times10^5$ Pa, from about $1\times10^5$ Pa to about $2.4\times10^5$ Pa, from about $1\times10^5$ Pa to about $2.2\times10^5$ Pa, from about $1\times10^5$ Pa to about $2\times10^5$ Pa and all ranges and sub-ranges therebetween. The gas may include compressed nitrogen, compressed air or a mixture thereof.

As shown in FIG. 7, the method may include directing the gas at the glass ribbon by supplying or guiding the glass ribbon 300 along at least a portion of a gas bearing 312 including a curved support 310, through which the gas is directed to the glass ribbon. The gas forms a gas film 313 on which the glass ribbon is supported. In some embodiments, the method includes heating the gas supplied through the gas bearing 312 by heating the curved support 310. In one or more embodiments, the curved support 310 may be heated to a temperature such that the gas supplied through the gas bearing 312 is also heated to a temperature within about 10° C. of the temperature of the curved support. For example, as will be discussed below, the method may include heating the curved support 310 to a temperature in the range from about 200° C. to about 400° C. and as a result, heating the gas to a temperature within about 10° C. of the temperature of the curved support.

As shown in FIG. 7, the method includes redirecting the glass ribbon 300 along a turn 320 that may have a horizontal length 322 of about 200 mm or less, 100 mm or less, 90 mm or less, 80 mm or less, 70 mm or less, 60 mm or less, 50 mm or less and all ranges and sub-ranges therebetween. The horizontal length 322 of the turn 320 indicates a small radius turn may be achieved by the process and apparatus shown in FIG. 7, thus minimizing the size of the process and apparatus layout. In one or more embodiments, the glass ribbon 300 is redirected while still viscous. In some embodiments, the method may include allowing viscosity of the redirected glass ribbon 302 to increase as the glass ribbon cools; however, in other embodiments, the method includes the redirected glass ribbon 302 viscosity to substantially the same viscosity as the glass ribbon 300 before redirection.

In one or more embodiments, the method includes rotating the curved support 310 or providing a stationary curved support 310. The method may also include directing gas through the gas bearing 312 of the curved support in one direction (as shown in FIG. 7) along a portion of its arcuate surface 314 or in all directions (not shown) through all of its arcuate outer surface 314. The gas directed on the arcuate surface 314 forms an arcuate gas film 313 for supporting the glass ribbon 300 during redirection at the turn 320. In embodiments in which the gas bearing 312 directs gas in one direction, the method may specifically include rotating the curved support 310 to homogenize the temperature distribution of the curved support. A homogenized temperature distribution prevents bowing of the curved support often caused by temperature variations. The method may include positioning the curved support 310 on the internal side of the turn 320. In one or more embodiments, the method may include providing a second support (not shown) including an air bearing to guide the glass ribbon 300 with the curved support 310 during redirection.

As shown in FIG. 7, the method may further include supplying the redirected glass ribbon 302 onto a second gas bearing 332 including a horizontally disposed, planar support 330. The method includes directing gas from the second gas bearing 332 to form a gas film 333 supporting the redirected glass ribbon 330 on one side.

In the embodiment shown in FIG. 8, the method may include redirecting the glass ribbon 400 from the first direction to the second direction by supporting the glass ribbon on a gas film 433 supplied by directing gas to the glass ribbon from only one gas bearing 432 directing air upward in the opposite direction as the glass ribbon, as it falls in a vertical direction. In the embodiment shown the gas bearing 432 may include a horizontally disposed, planar support 430 which provides a planar gas film 433. In such embodiments, the method includes allowing the glass ribbon 400, in contrast to the embodiment in FIG. 7, to fall unguided, due to gravity and its own viscosity and/or thickness, toward the horizontally disposed, planar support 430. The method includes directing gas upward from the gas bearing 432 and forming the planar gas film 433 to support the glass ribbon during redirection from the first direction to the second direction. In one or more embodiments, the method includes redirecting the glass ribbon 400 at turn 420 using the gas film 433. In some embodiments, the method includes redirecting the glass ribbon 400 at the turn 420 over the same or similar length as the turn 320 in FIG. 7 (e.g., 200 mm or less, 100 mm or less, 90 mm or less, 80 mm or less, 70 mm or less, 60 mm or less, 50 mm or less and all ranges and sub-ranges therebetween). In one or more embodiments, the glass ribbon 400 is redirected while still viscous. In some embodiments, the method may include allowing viscosity of the redirected glass ribbon 402 to increase as the glass ribbon cools; however, in other embodiments, the method includes the redirected glass ribbon 402 viscosity to substantially the same viscosity as the glass ribbon 400 before redirection.

In one or more embodiments, the method may include modifying the speed (e.g., increased or decreased) of supplying the glass ribbon. In one or more embodiments, the method includes modifying the speed, without the use of a curved support. As shown in FIG. 8, a system 440 including a sensor and a speed control in communication with one another can be utilized to modify the speed of supplying the glass ribbon. For example, a sensor may be used to optically detect the shape of the redirection, and send a signal to increase or decrease the speed of the line or the method by which the glass ribbon is supplied.

Figure 12:
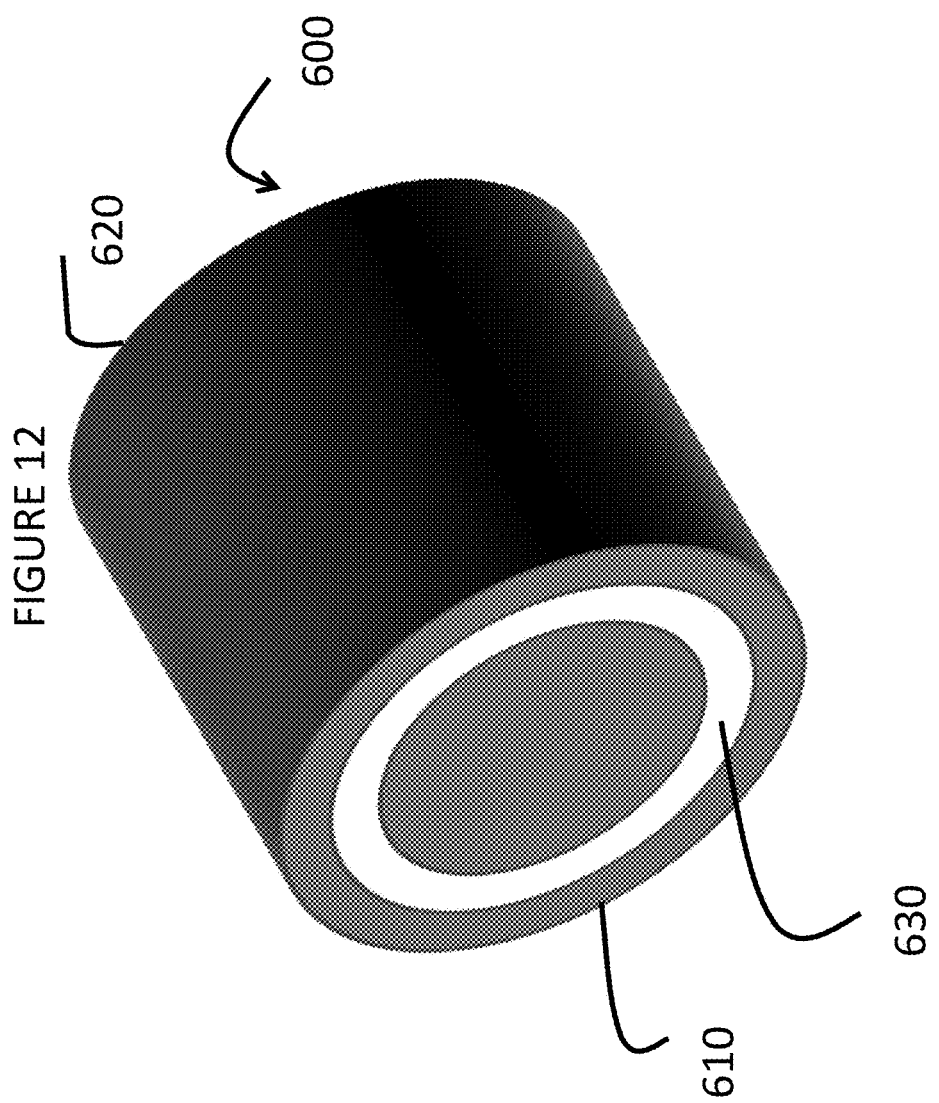
FIG. 12 shows a perspective view of a curved support according to one or more embodiments.
Figure 13:
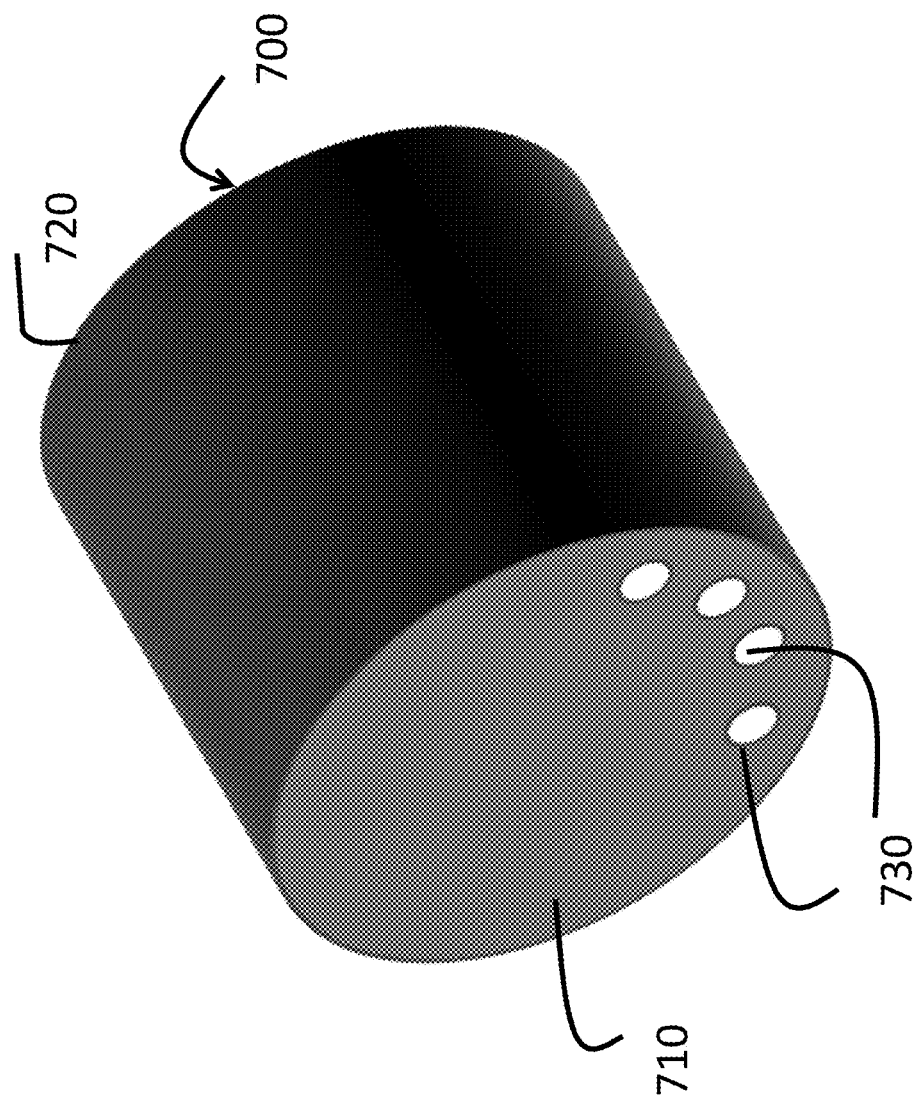
FIG. 13 shows a perspective view of a curved support according to one or more alternative embodiments.

With respect to the gas bearing(s) 312, 332, the curved support 310 and the horizontally disposed, planar support 330 may be formed at least partially from a pressurized, porous material through which the gas from the gas bearing is flowed. The porous material which may include graphite, ceramic, partially sintered metal, high temperature tolerant metal oxide(s), silicon carbide and other similar materials through which gas may be flowed at the recited pressures. The permeability of the porous material may be in the range from about $10^{-15}$ m$^2$ to about $10^{-13}$ m$^2$. The method may include supplying a gas to the porous material through a feed or a plurality of feeds as shown in FIGS. 10-12. In FIG. 10, the method includes supplying the gas through a series of feeds 434, having one open end 436 and one closed end 438. The open and closed ends alternate along the length of each side of the horizontally disposed, planar support. The feeds may be disposed near or adjacent to the upper surface 435 of the horizontally disposed, planar surface. For example, the feeds are disposed within 3 mm or 5 mm from the upper surface 435.

As shown in FIG. 11, the curved support 600 may include a first end 610, a second end 620 and an annular feed 630 extending from the first end 610 to the second end 620 defining an annular space through which gas is supplied for the gas bearing. Alternatively, the curved support 700 may include a first end 710, a second end 720 and discrete longitudinal feeds 730 extending from the first end 710 to the second end 720 through which gas is supplied for the gas bearing. The method may include supplying gas through the annular feed 630 or longitudinal feeds 730 for the gas bearing.

In one or more embodiments, the method includes introducing a minimal or no tension to the glass ribbon during redirection. In one or more alternative embodiments, the method includes applying a tension to the glass ribbon during redirection to further reduce the thickness of the glass ribbon. The thickness may be reduced by up to about 20%, up to about 25%, or even up to about 30%. In one or more embodiments, the tension in the glass ribbon is created between supplying the glass ribbon along at least a portion of a curved support (e.g., 310) and supplying the glass ribbon to the horizontally disposed, planar support (e.g., 330).

In one or more embodiments of the method, redirecting the glass ribbon includes maintaining the temperature of the glass ribbon such that the glass ribbon exhibits a desired viscosity (e.g., less than about $10^8$ poise, about $10^{7.8}$ poise or less, about $10^{7.6}$ poise or less, about $10^{7.4}$ poise or less, about $10^{7.2}$ poise or less, about $10^7$ poise or less). In some embodiments, the method includes maintaining the temperature of the portion of the glass ribbon exhibiting a low viscosity, at the first temperature, as defined herein. The temperature of the glass ribbon or the portion of the glass ribbon exhibiting a low viscosity may be maintained by directing gas to glass ribbon, thus creating a gas bearing effect where the gas bearing and/or the gas film generated by the gas bearing have a temperature in the range from about 200° C. to about 400° C. Additionally or alternatively, the method may include controlling the environment and specifically controlling the temperature of the environment during at least the redirection.

In one or more embodiments, the redirected glass ribbon exhibits a thickness in the range from about 0.1 mm to about 5 mm, from about 0.1 mm to about 4 mm, from about 0.1 mm to about 3 mm, from about 0.1 mm to about 2 mm, from about 0.1 mm to about 1 mm, from about 0.5 mm to about 5 mm, from about 0.75 mm to about 5 mm, from about 1 mm to about 5 mm, from about 1.5 mm to about 5 mm, from about 0.1 mm to about 0.9 mm, from about 0.1 mm to about 0.8 mm, from about 0.1 mm to about 0.7 mm, from about 0.1 mm to about 0.6 mm, from about 0.1 mm to about 0.5 mm, and all ranges and sub-ranges therebetween. In some instances, the method includes reducing the thickness of the glass ribbon during redirection of the glass ribbon from the first direction to the second direction. In one variant, the method includes reducing the thickness of the glass ribbon by about 5%, about 10%, about 15%, about 20% or about 25% during redirection of the glass ribbon from the first direction to the second direction. In one or more alternative embodiments, the method includes substantially maintaining the thickness of the glass ribbon. In one variant, the method includes maintaining the thickness of the glass ribbon during redirection such that the glass ribbon in the second direction is no more than 5% less than the thickness of the glass ribbon in the first direction.

In one or more embodiments, the methods described herein can form and redirect a glass ribbon having a thickness of about 1 mm or about 1.1 mm, a width in the range from about 60 mm to about 70 mm at a speed of about 11 m/minute. In some embodiments, the glass ribbons were thus formed and redirected using a gas bearing system as described herein directing gas at the glass ribbon at a pressure of about 0.2 MPa. The resulting glass ribbon exhibits a superior flatness, is free of optical distortions and shows no visual damage indicating possible contact between the glass ribbon and a solid material.

The method according to one or more embodiments may include cooling the glass ribbon into a glass sheet. The embodiment shown in FIG. 9 illustrates a glass ribbon 400 supplied via a thin rolling process. In particular, the method includes supplying molten glass from a glass feed device 500 to a pair of forming rolls 510 and forming a glass ribbon 400 having a thickness near a desired thickness. The method includes supplying the glass ribbon 400 to a pair of sizing rolls 520 to modify the thickness of the glass ribbon. The method includes redirecting the glass ribbon 400 from a vertical direction to a horizontal direction at turn 420 by supporting the glass ribbon 400 on a gas film supplied by the gas directed at the glass ribbon 400 by the air bearing of the horizontally disposed, planar support 430. The gas film supports and transports the glass ribbon 400 onto conveyors 540 for thermal processing in a furnace 530, controlled cooling 550, separation into discrete sheets (e.g. by score and break) 560 and final cooling 570. The glass sheet may be optionally processed by one or more of a ceramming process or an ion exchange process.

A second aspect of the present disclosure pertains to a glass or glass-ceramic forming apparatus. In one or more embodiments, the apparatus includes glass feed device for supplying a glass ribbon exhibiting a viscosity of less than about $10^8$ poise in a first direction (e.g., vertical) and a redirection system for redirecting the glass ribbon to a second direction (e.g., horizontal). As shown in FIGS. 1-6 and mentioned herein, the glass feed device may include a number of configurations and systems for supplying a glass ribbon. As shown in FIGS. 1-2, the glass feed device may include a forming body 110 including an open slot 112 for flowing molten glass 120 vertical direction on a roll pair 130, which rotate to form the glass ribbon 140.

As shown in FIGS. 3-6, the glass feed device may include a thin rolling system. The glass feed device may include a glass feed unit 200, a heater (not shown) for supplying the molten glass 210 at a temperature of 1000° C. or higher and may include at least one pair forming rolls 220 (which may be heated, for example, at a surface temperature of about 250° C. or greater, 500° C. or greater, or 600° C. or greater) located vertically below the glass feed unit 200. The glass feed device may optionally include at least one pair of sizing rolls 222, as shown in FIG. 4, located vertically below the forming rolls 220 to reduce the thickness of the glass ribbon received from the forming rolls 220. As shown in FIGS. 5 and 6, the glass feed device may optionally include a pair of pulling rolls 224 may be located vertically below the sizing rolls 222 for receiving the sized glass ribbon 232 and creating a tension on the formed glass ribbon 230 and/or the sized glass ribbon 232.

In one or more alternative embodiments, the glass feed system may include a fusion forming system (not shown). In one or more specific embodiments, the fusion forming system may include a melting furnace (not shown) for melting batch material to produce molten glass in communication with a fining vessel that heats the molten glass. The fusion forming system may include a stirring vessel (not shown) in communication with the fining vessel for homogenizing the molten glass and a forming body (not shown) in communication with the stirring vessel. The forming body may an open channel (not shown) defined by a plurality of walls (not shown), a pair of converging forming surfaces (not shown) that converge at a bottom of the forming body. In operation, the molten glass from the stirring vessel into the open channel of the forming body and overflows the walls thereof, thereby separating into two individual flows of molten glass that flow over the converging forming surfaces (not shown). When the individual flows of molten glass are flowed vertically and are recombined to form a single ribbon of molten glass that descends from the forming body. In this manner, fusing forming system provides a drawn glass ribbon in a first direction, which may be vertical.

The apparatus of one or more embodiments includes a redirection system disposed underneath the glass feed device for redirecting the glass ribbon to a second direction. In one or more embodiments, the redirection system includes at least one gas bearing system for supplying a gas film for supporting the glass ribbon during redirection. The at least one gas bearing system 310 may include a curved support 310 having an outer curved surface 314 for providing an arcuate gas film surface that redirects the glass ribbon to the second direction. In one or more embodiments, the curved support 310 may be rotatable around a first axis in a direction in which the glass ribbon is supplied. In one or more alternative embodiments, the curved support 310 may be stationary.

As shown in the embodiment of FIG. 7, the apparatus may include a second gas bearing 332. The second gas bearing 322 may include a horizontally disposed, planar support 330 for providing a planar gas film 333 that supports the redirected glass ribbon in the second direction. In one or more embodiments, the apparatus includes a gas bearing including a horizontally disposed, planar support but does not include a gas bearing including a curved support.

In one or more embodiments, the apparatus includes system for monitoring the redirection of the glass ribbon. As shown in FIG. 8, the system 440 may be positioned to monitor the shape of the glass ribbon 400 as it is redirected at turn 420. The system 440 may include a sensor for detecting a shape of the redirection of the glass ribbon. The sensor may include an optical detector. In one or more embodiments, the sensor may be in communication with a speed control. The sensor may provide a signal to the speed control to increase or decrease the supply of the glass ribbon. In one or more embodiments, the speed control is in communication with the glass feed device and/or the gas bearing(s).

What is claimed is:

1. A method of forming a glass article comprising
supplying a glass ribbon in a first direction, at least a portion of the glass ribbon exhibiting a viscosity of less than about $10^8$ poise and greater than about $10^6$ poise; and
redirecting the glass ribbon to a second direction different from the first direction without contacting the glass ribbon with a solid material,
wherein the glass ribbon exhibits a thickness of about 1 mm or less in the second direction, and the at least a portion of the glass ribbon exhibits a viscosity of less than $10^{7.4}$ poise and greater than $10^6$ poise during the redirecting.

2. The method of claim 1, wherein redirecting the glass ribbon comprises supporting the glass ribbon on a gas film supplied by directing gas to the glass ribbon having a pressure in the range from about $1\times10^5$ Pa to about $3\times10^5$ Pa.

3. The method of claim 2, wherein directing gas to the glass ribbon comprises:
guiding the glass ribbon along a first gas bearing including a curved support, and optionally guiding the glass ribbon along a second gas bearing including a horizontally disposed, planar support after guiding the glass ribbon along the first gas bearing.

4. The method of claim 3, wherein the first bearing includes a first end and a second end, and an annular feed between the first end and the second end, and the method further comprises supplying gas through the annular feed.

5. The method of claim 3, wherein the first bearing includes a first end and a second end, and discrete longitudinal feeds between the first end and the second end, and the method further comprises supplying gas through the longitudinal feeds.

6. The method of claim 4, wherein the gas includes compressed nitrogen, compressed air or a mixture thereof.

7. The method of claim 5, wherein the gas includes compressed nitrogen, compressed air or a mixture thereof.

8. The method of claim 2, wherein directing the glass ribbon further comprises guiding the glass ribbon onto a gas bearing, the gas bearing comprising a horizontally disposed, planar support.

9. The method of claim 8, further comprising creating a tension in the glass ribbon.

10. The method of claim 9, wherein the glass ribbon exhibits a shape during redirection and the method further comprises sensing the shape and controlling at the speed of at least one of the glass ribbon supply and the gas directed to the glass ribbon based on the sensed shape.

11. The method of claim 3, wherein the second gas bearing comprises a porous material and the method further comprises supplying a gas to the porous material through a series of feeds.

12. The method of claim 2, wherein the gas has a temperature in the range from about 200° C. to about 400° C.

13. The method of claim 2, wherein the gas includes compressed nitrogen, compressed air or a mixture thereof.

14. The method of claim 1, wherein supplying the glass ribbon comprises flowing molten glass between at least one pair of forming rolls, and wherein the molten glass is optionally flowed vertically.

15. The method of claim 14, wherein supplying the glass ribbon further comprises reducing the thickness of the glass ribbon.

16. The method of claim 1, further comprising cooling the glass ribbon into a glass sheet.

17. The method of claim 16, further comprising processing the glass sheet by at least one of an ion exchange process and a ceramming process.

18. The method of claim 1, wherein supplying the glass ribbon comprises any one or more of:
   flowing molten glass into a forming body comprising a plurality of walls defining an open channel and overflowing the flowing molten glass over the walls of the forming body into two individual flows of molten glass that combine to form the glass ribbon, wherein the combined individual flows of molten glass are flowed vertically, and
   flowing molten glass through a forming body comprising an open slot.

19. The method of claim 1, wherein the redirecting comprises supporting the glass ribbon on a gas film supplied by directing gas to the glass ribbon with a single gas bearing comprising a horizontally disposed, planar support that directs gas in a direction opposite the motion of the glass ribbon as it falls in a vertical direction.

20. A method of forming a glass-ceramic article comprising
   supplying a glass ribbon in a first direction, at least a portion of the glass ribbon exhibiting a viscosity of less than about $10^8$ Poise and greater than about $10^6$ poise;
   redirecting the glass ribbon to a second direction different from the first direction without contacting the glass ribbon with a solid material to provide a precursor glass ribbon exhibiting a thickness of about 1 mm or less in the second direction; and
   ceramming the precursor glass ribbon to form a glass-ceramic,
   wherein the at least a portion of the glass ribbon exhibits a viscosity of less than $10^{7.4}$ poise and greater than $10^6$ poise during the redirecting.

* * * * *